March 4, 1958 F. S. MACOMBER 2,825,600
VEHICLE BODY FOR SEGREGATING AND PALLETIZING
FREIGHT SHIPMENTS
Filed Sept. 22, 1955 2 Sheets-Sheet 1
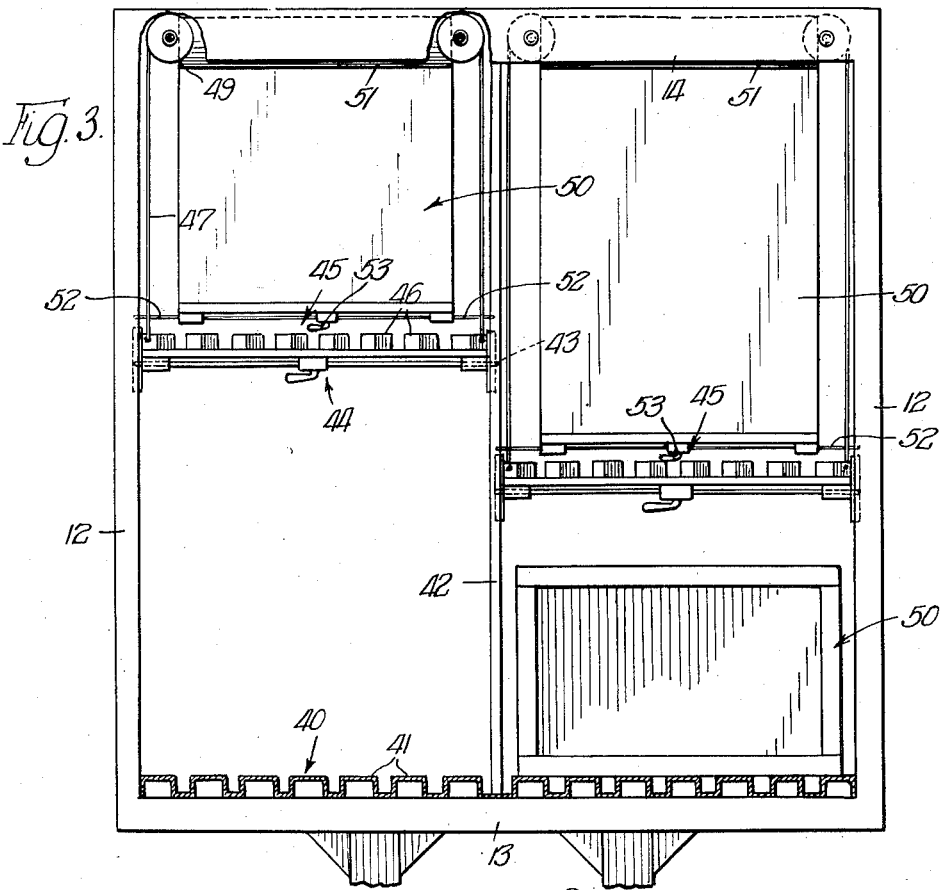
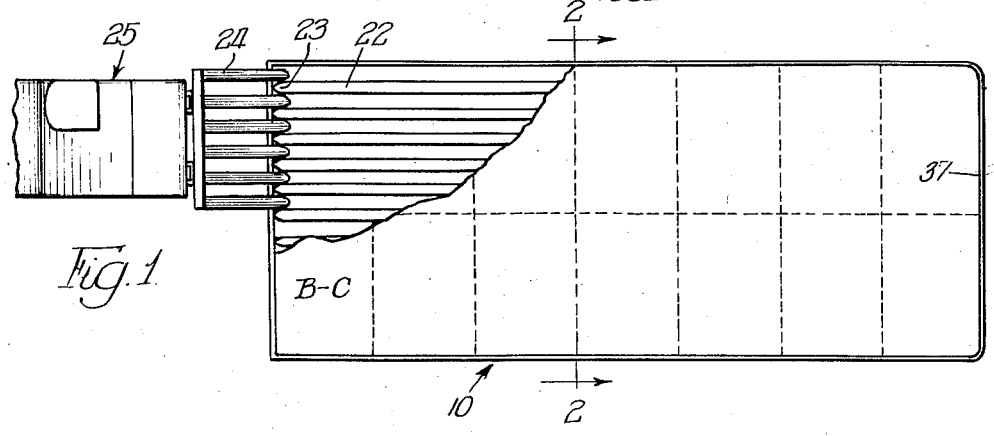
INVENTOR.
Franklin S. Macomber,
BY

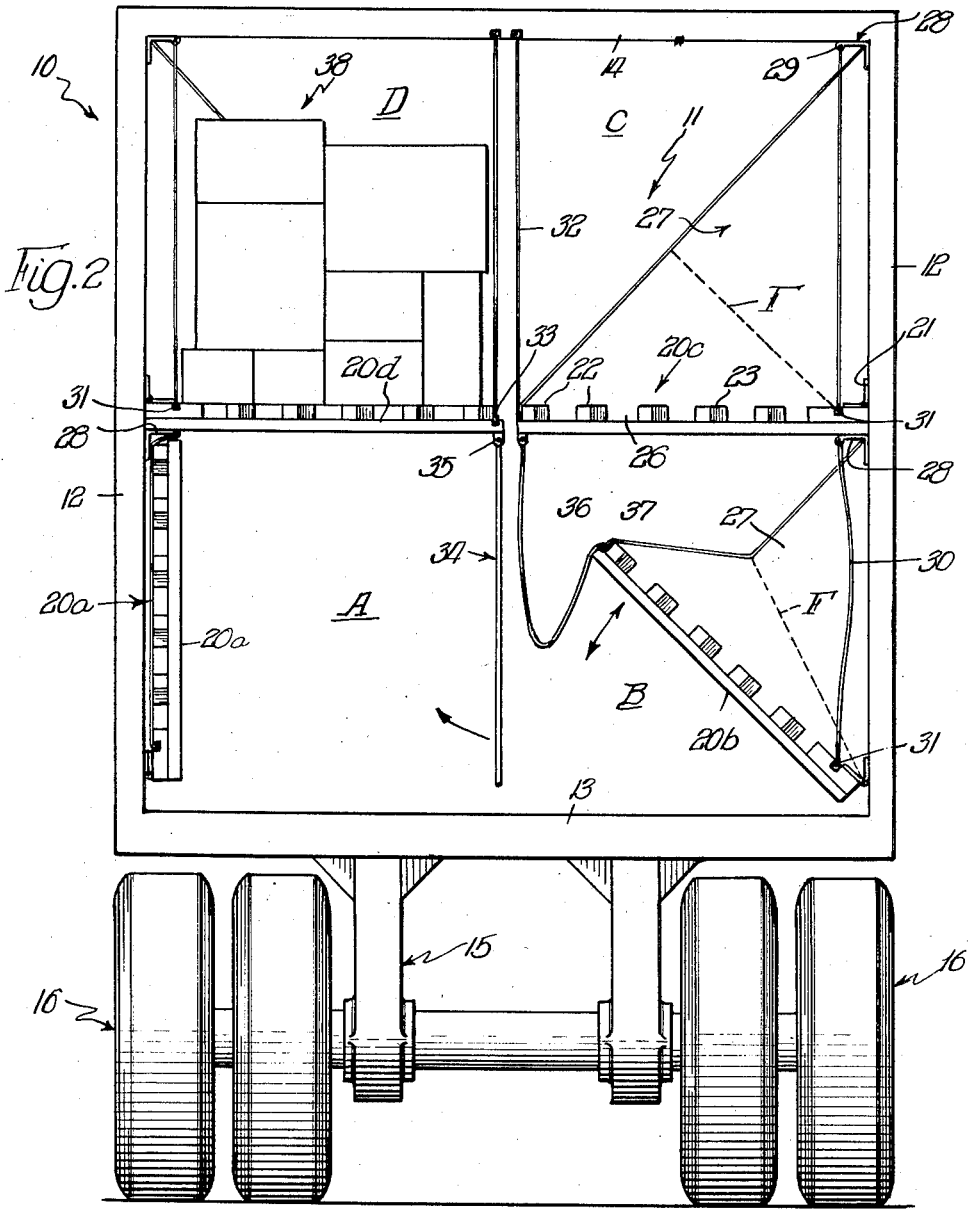

United States Patent Office 2,825,600
Patented Mar. 4, 1958

2,825,600

VEHICLE BODY FOR SEGREGATING AND PALLETIZING FREIGHT SHIPMENTS

Franklin S. Macomber, Park Ridge, Ill.

Application September 22, 1955, Serial No. 535,978

5 Claims. (Cl. 296—24)

The present invention is directed to improvements in tractor drawn material handling trailers or truck bodies and more particularly to a compartmentizing means for such vehicles useful for expediting the mechanical handling and shipping of materials therein according to an improved material handling system.

Briefly, the present invention is concerned with the structural aspects of an improved tractor drawn trailer or truck body whereby such is internally divided to accommodate the storage, loading and unloading of individual shipments of materials; the compartmentizing means being specifically designed for cooperation with a material handling device, such as an industrial multiple fork lift truck. The basic structural aspects of the invention are directed to the provision of collapsible compartment systems for the interior of a tractor drawn trailer or truck body which includes a special palletizing means for cooperation with multiple forks of a lift truck material handling device. Provision is made for retracting or disassembling the compartment system within the trailer body, as desired, so that individual compartments provided thereby may be progressively loaded and unloaded from the rear or loading end of the trailer. In general, the compartmented trailer of this invention forms the heart of an improved handling system for replacing present hand and semi-mechanized methods of handling freight and such finds utility both in city pickup and delivery of the freight as well as cross country transportation thereof.

Present material handling and shipping methods employed by motor freight carriers for handling freight from a customer's dock in the origin city to the customer's dock in the destination city, generally comprise a total of six individual package handling operations substantially as follows:

(1) Individually loading each piece of the shipment on board a city pickup truck at the point of origin.

(2) Transferring the shipment piece by piece from the pickup truck to the origin terminal dock and placing it in storage at appropriate location for further delivery.

(3) Moving the shipment from its storage point at the origin terminal to the highway trailer which transports such to its destination terminal.

(4) Unloading the shipment from the highway trailer at the destination terminal dock and placing it in storage for further delivery.

(5) Loading the shipment piece by piece onto the city delivery truck from the destination terminal storage location.

(6) Unloading the shipment from the city delivery truck to the customer's dock at the destination terminal.

In each handling instance outlined above, the individual pieces in the several shipments are normally handled separately and by hand. Additionally, six separate visual checks are required to make certain that each item is counted physically and checked with bills of lading and other paper records. This present system is further complicated by the fact that shipments are mixed up in the city pickup and delivery trucks, as well as the cross country highway trailer. This requires each individual piece of the shipment to be individually selected from each conveyance.

The basic purpose of my present invention is to provide a means whereby an integrated system for mechanically handling truck carried freight may be accomplished in a manner avoiding the time consuming individual piece handling of present day systems and the losses which occur from mixing the freight on board the transporting equipment. The underlying concept of my invention is to permit the vehicle operator to keep each shipment separate on board the hauling vehicle by providing such with multiple compartments sufficiently flexible to hold shipments of various sizes and which can be combined both vertically and horizontally within the confines of the vehicle's interior. The compartments are so designed as to support the freight on underlying parallel rails to provide access of multiple forks of industrial lift trucks or like material handling means therebeneath so that the entire shipment may be removed from the hauling vehicle on the bare forks of the lift truck as a single unit rather than by handling the individual pieces thereof. Suitable, flexible, compartmenting materials provide at least three collapsible sides for each compartment to hold the individual shipments in place and to separate the same. The flexibility of the compartment forming means also permits the retraction thereof against the walls of the trailer with simple motion which feature is especially helpful when the freight or object being handled does not particularly lend itself to the normal size of the compartment.

The main object of this invention is to provide a new and improved compartmentizing means for the interior of tractor drawn trailers for the purpose of permitting the handling of shipments in and out of the truck by mechanical means rather than by hand thereby avoiding costly piece by piece handling.

A further object of this invention is to provide a new and improved material handling system for loading, unloading and transporting materials in truck trailers and like conveyances.

A still further object of this invention is to provide a new and improved compartmentizing means for use in tractor drawn trailers or like conveyances which are collapsible and flexible in nature so that the interior of such trailer may be divided into individual spaces of selected size.

A still further object of this invention is to provide a new and improved compartmentizing means for a tractor drawn trailer which includes a palletizing means which makes provision for loading and unloading materials in and out of individual compartments by multiple fork industrial lift trucks and like mechanical material handling devices thereby to avoid manual handling.

A still additional object of this invention is to provide a collapsible compartmentizing means for the interior of a tractor drawn trailer or like vehicle which is constructed to provide a flexible compartment arrangement which may be selectively collapsed and varied in size to facilitate the storage and handling of individual shipments of materials according to the most economical utilization of the interior space of the trailer.

Still another object of this invention is to provide a new and improved compartmentizing means for a truck drawn trailer which is selectively collapsible to accommodate the progressive loading and unloading of the materials in the individual compartments by a mechanical material handling device.

Still another object of this invention is to provide a new and improved collapsible compartment system for the interior of a tractor drawn trailer or like vehicle which provides a series of retractable pallet means for supporting separated shipments of materials within the individual compartments, such pallet means cooperating with a multiple fork lift truck or like material handling devices.

The above and further objects, features and advantages of this invention will be recognized by those familiar with the art from the following detailed description of a preferred and modified version thereof illustrated particularly in the accompanying drawings.

In the drawings:

Figure 1 is a top plan view of a conventional truck drawn trailer with a portion of its roof broken away to demonstrate the pallet feature of my invention and its cooperation with a schematically shown multiple fork lift truck;

Figure 2 is a transverse cross-sectional view of the truck trailer shown in Figure 1, taken substantially at line 2—2 of that figure and illustrating the collapsible compartment means of this invention; and Figure 3 is a partial cross-sectional view similar to Figure 2, illustrating a first modified form of the compartment means of this invention.

Turning now to the particulars of the invention as disclosed in Figures 1 and 2 of the drawings, a preferred embodiment of my invention is shown in association with a conventional truck drawn trailer indicated generally by numeral 10. It will be understood that the trailer 10 has its interior divided into individual compartments or cubicles such as A, B, C, etc. by the improved compartmentizing means or structure of this invention designated generally by numeral 11 in Figure 2.

The several compartmentizing means 11 utilized for separating the interior of the trailer 10 into individual cubicles are substantially identical except for minor variations in the compartmentizing means in the lower tier thereof, as will be explained presently. As illustrated, a truck trailer having side walls 12—12, a bottom or floor wall 13, and a top wall 14 is supported on an under carriage or chassis structure 15 associated with the ground engaging wheel means 16. In the particular embodiment illustrated in Figure 1, for example, twenty-eight such compartmentizing means 11 are provided to separate the interior of the trailer body into a like number of compartments with each compartment enclosing substantially one-fourth of the transverse cross-sectional area of the trailer and one-seventh of its longitudinal dimension.

Generally, each compartment forming means 11 includes a pallet material supporting shelf, such as shelves 20a, 20b, 20c and 20d of Figure 2, which are supported at one edge by hinge means 21 and attached to the side walls of the trailer. Each pallet shelf is particularly distinguished by a plurality of longitudinally extending and parallel spaced rib or rail members 22—22 which have pointed outer ends 23 (see Figure 1) for guiding forks 24 of an industrial lift truck means 25 into the parallel spaces 26 which are formed between the several rail members. A wall member 27, herein shown triangular shaped and preferably formed of rubberized or flexible material such as rubber belting, extends between the rear edge of the pallet shelf and the side walls 12 of the trailer. In this regard, it will be noted that adjacent compartment means have their triangular wall portions 27 so arranged that the hypotenusal sides thereof extend angularly downward from the side walls 12 of the trailer. Spring clip means 28 are suitably supported on the side walls of the trailer each with a resilient detent leaf portion 29 extending inwardly of the trailer's interior for engaging the upper ends of the pallet shelves when the same are swung to their upward or stored condition as illustrated in compartment A of Figure 2. Such spring clip means are designed to resiliently hold the shelves and the attached wall forming means such as triangular wall portions 27 in a stored condition according to the desires of the material handling personnel.

Extending vertically between such clip members 28 and the pallet shelf means 20a, etc. in a plane substantially parallel to the side walls of the trailer, are a series of vertically extending belts 30; each having connection with its associated pallet shelf as by pin members 31 or like connective means. Belts 30 are preferably of rubber or like material and serve to hold freight away from the side walls 12 of the trailer. It will be appreciated from the showing of compartmentizing means 11 in compartment B of Figure 2, that the belt means 30 are suitably slackened when the pallet shelves are raised to their stored condition adjacent the side walls of the trailer. Conversely, when the pallet shelves are lowered, as shown in compartment C, the belts 30 are sufficiently tensioned to keep the freight away from the side walls of the trailer, thereby providing clearance so that the left truck may remove the freight by backing straight out of the trailer even though shelves to the rear thereof are all in their folded position.

The outer ends of the upper pallet shelves, such as shelves 20c and 20d for compartments C and D of Figure 2, are further equipped with a wall forming flexible belt means 32 depending from the roof wall 14 of the trailer and pinned to the outer ends of such pallet shelves as at 33. Thus when the upper pallet shelves are lowered, belts 32 provide separating walls between the upper compartments, as for example compartments C and D.

The upper pallet shelves, such as pallet shelf 20d which forms the bottom wall for compartment D, may be further equipped with depending gate walls 34 of rigid material which under some conditions may become the supporting member to take the weight of the shelf and freight stored thereon. Wall 34 is pivotally attached at its one end to the lower side of the pallet shelf 20d and adjacent the outer end of the latter as by pivot means 35. Thus when both pallet shelves 20a and 20d are in their lowered position, wall 34 will depend substantially vertically to form a separation between compartments A and B. When pallet shelf 20d is raised to its stored condition, the separating wall 34 folds in parallelism against the back face thereof so that the same may be unobtrusively stored.

As an alternative to the rigid separating wall 34, a flexible wall 36, similar to wall 32, may be attached between the pallet shelves of the upper and lower compartments, as shown for the compartmentizing structure of compartment B. In this variation, the wall 36 may comprise flexible belting material, such as used for separating walls 32, preferably attached to the lower compartment pallet shelves, such as pallet shelf 20b, by removable pin means 37, so that the overlying pallet shelf 20c, for instance, may be raised to its stored condition without disturbing or raising the underlying pallet shelf 20b.

Having thus set forth the elements which comprise the first form of compartment forming means of this invention, it is well now to consider the operation of the same, as illustrated in Figure 2, wherein various conditions of operation are successively shown in compartments A, B, C and D.

Considering compartment A, initially, it will be seen that the pallet shelf 20a therein is shown stored paralleling the side wall 12 of the trailer so that it is in a substantially vertical condition with its upper end held beneath the resilient clip means 28. In this condition, the flexible wall means 27 is folded between the pallet shelf 20a and the side wall 12 of the trailer, as at fold line F shown in compartments B and C.

As next shown in compartment B, release of the pallet shelf from the clip means 28 permits its downward swinging movement to unfold the triangular shaped wall 27, the spacing wall 30 and the flexible separating wall 36.

The fully lowered or operating condition for the compartmentizing means 11 is shown in compartment C of Figure 2, wherein triangular shaped wall 27 assumes its planar condition while spacing walls 30 and separating wall 32 are disposed vertically and the pallet shelf 20c is substantially horizontal.

In compartment D, the operation of compartmentizing means 11 is shown in association with a plurality of individual packages such as would make up an individual shipment, indicated generally by numeral 38.

It will be understood, of course, that the several compartments A, B, C, D, etc., which are formulated by the individual compartmentizing means 11, there being twenty-eight such compartments in a particular embodiment illustrated in Figure 1 of the drawings, may be individually collapsed and lowered to an operative position at the desire of the operator so as to selectively accommodate the space within the trailer body to the size and shape of the particular shipments being compartmentized or separated.

It is also the intention of operation that in loading the trailer, those compartments disposed closest to its forward end, or that is, the end removed from the tail gate of the trailer will be initially lowered to their operative positions and loaded with separated shipments. As the loading progresses, the operator progressively lowers or activates the individual compartmenting means from the front of the trailer to the back; the fork lift truck means 25 being utilized for the purpose of unloading in conjunction with the parallel rails 22 of the pallet shelves. In this latter respect, it is also contemplated that the multiple fork lift truck means 25 will be utilized in certain instances for loading the compartments, as in transferring the shipments from the destination terminal dock to the delivery trailer in the destination city; such dock having storage racks equipped with pallet shelves for use with the lift truck forks, similar to shelves 20a, 20b, etc.

Without dwelling further on the aspects of the first form of my invention shown in Figures 1 and 2 of the drawings, attention now is directed to Figure 3 of the drawings where a modified version of the compartmentizing means of this invention is set forth. As seen in that figure, the trailer 10 with side walls 12—12, a bottom wall 13 and a top wall 14 is formed with a permanent pallet floor 40, comprising longitudinally extending rails 41—41 which may preferably be formed by metal channel members of extruded aluminum or fabricated steel. A series of upright divider segments 42 are positioned substantially along the longitudinal center line of the trailer and extend from the roof wall 14 to the bottom wall 13. The dividing segments 42 are removable so that the compartments within the trailer's interior may be collapsed. Such divider segments are further supplied with a series of vertically aligned spaced openings (not shown) for engaging locking pins 43 of a latching mechanism 44 associated with pallet shelves 45. The side walls of the trailer are likewise supplied at spaced intervals with suitable vertically aligned spaced openings which register with the openings in the dividing segments 42; such openings in the side walls of the trailer likewise cooperating with the locking pins 43.

Each pallet shelf 45, comprises as before described, a series of longitudinally extending pallet rails 46—46 which define fork receiving slots or openings therebetween for cooperation with a multiple fork lift truck. Whereas the pallet shelves previously described were designed to swing pivotally relative to the side walls of the trailer, the modified pallet shelf construction of Figure 3 is suspended from a series of counter balanced cables 47 which are connected to and wound about spring reels 49 mounted in the overhead or roof 14 of the trailer. In the retracted position of the pallet shelves 45, therefore, such reside adjacent the top or roof 14 of the trailer.

Preferably, at least, the compartments above the pallet shelves are separated longitudinally by separating rubber fabric or canvas curtains 50 mounted on spring reels 51 in the roof; such reels 51 being in between the ends of adjacent sets of the longitudinally disposed reels 49. Spring loaded latch pins 52—52 operated by handle means 53 serve to secure the curtains 50 at a desired position; pins 52 entering holes (not shown) in separators 42 and side walls 12 of the trailer similar to the latch pins 52. Such curtains 50 are especially desired to maintain lighter freight articles separated in the upper compartments, thereby to prevent their shifting between compartment as at braking the truck etc.

To operate the modified pallet shelves 45, it is first necessary that the latching mechanism 44 be suitably operated so that the pins 43 thereon are retracted. By then pulling downwardly on the shelves 45, and engaging pins 43 with selected openings in the separating or dividing segments 42 and the side walls 12 of the trailer, the shelves may be locked in position at the desired height to accommodate the articles of freight, such as article 50. The main advantage of the modified structure of Figure 3 resides in its ability to compartmentize the trailer's interior to meet various vertical dimensions of the freight articles, thereby to utilize the interior spacing of the trailer to its best advantage. An obvious modification is also contemplated where the pallet shelves extend the full width of the trailer and are moved up and down and locked in substantially the same manner, as shown in Figure 3.

While I have hereinabove described a first preferred and modified form of my invention, as illustrated in the accompanying drawings, it is obvious that the various materials and structural aspects ascribed thereto are subject to modification, change and substitution of equivalents without necessarily departing from the spirit and scope of my invention. As a consequence, it is not my intention to be limited to the particulars of the structures described and shown herein except as may appear in the following appended claims.

I claim:

1. A truck trailer for hauling miscellaneous freight of the class described, comprising, a trailer body, the interior of which is normally accessible through one end thereof, a plurality of separate collapsible compartments within the body, each having a rigid pallet shelf forming a bottom wall thereof for cooperation with the forks of a multiple fork lift truck when depositing and removing freight therefrom, flexible wall forming members supporting such shelves and separating adjacent compartments laterally and longitudinally of the trailer body, and means for storing said shelves and said wall forming members adjacent the interior walls of said body.

2. The combination as set forth in claim 1 in which said shelves have a plurality of longitudinally extending spaced rails forming parallel spaced channels therebetween for the reception of the fork arms of the lift truck whereby freight may be placed on and lifted off of said shelves on the bare forks of the lift truck.

3. In a freight carrying body of a trailer truck, the combination comprising, a plurality of pallet shelf members each having plural spaced rail elements for cooperation with the fork arms of a multiple fork lift truck when loading and unloading said shelves, flexible wall forming members suspending each of said pallet shelves from the interior walls of the trailer body and separating the interior of such trailer body laterally and longitudinally into individual compartments, and means for holding said shelves and wall forming means in a stored condition against the interior walls of said trailer body, as selected.

4. In a truck trailer of the class described, the combination comprising, a freight receptive body, a plurality of pallet shelf members each having plural spaced elements receptive of fork arms of a multiple fork lift truck in loading and unloading articles of freight and for supporting said freight directly thereon, means pivotally connecting said shelves to the interior side walls of said body, first flexible wall forming means suspending each of said pallet shelves from the interior side walls of said body and longitudinally separating adjacent shelves, additional wall forming means laterally separating adjacent compartments formed by said shelves and first wall forming means, and means for selectively locking said shelves and wall forming means adjacent the interior side walls of said body whereby said compartments may be selectively formed and collapsed as desired.

5. A means for separating the interior of a truck trailer into various sized compartments of selected size to accommodate the dimensions of freight articles stored therein and for segregating such freight articles, comprising in combination, a plurality of pallet shelf members, flexible wall forming means suspending said shelves from the roof of the trailer, said shelf members each having plural spaced rails on their upper surfaces whereby freight may be deposited and lifted off of said shelves as pallets by multiple fork lift truck means, plural spaced rail members extending longitudinally of the trailer and fixed to the floor thereof and providing freight carrying pallet means cooperative with a multiple fork lift truck means, means for retracting said shelves into a stored position adjacent the roof of the trailer, locking means on each shelf, and means in the side walls and intermediate the side walls of the trailer for cooperating with said locking means to selectively position said shelves at varying heights above the floor of the trailer.

References Cited in the file of this patent
UNITED STATES PATENTS

| | | |
|---|---|---|
| Re. 23,848 | Gerhardt | July 6, 1954 |
| 1,146,159 | Hart | July 13, 1915 |
| 2,605,912 | Small et al. | Aug. 5, 1952 |